(12) United States Patent
Zhang et al.

(10) Patent No.: US 8,425,223 B2
(45) Date of Patent: Apr. 23, 2013

(54) APPARATUS, SYSTEM AND METHOD FOR HEATING FUEL GAS USING GAS TURBINE EXHAUST

(75) Inventors: Hua Zhang, Greer, SC (US); Jatila Ranasinghe, Simpsonville, SC (US); Dean Matthew Erickson, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 1302 days.

(21) Appl. No.: 12/181,715

(22) Filed: Jul. 29, 2008

(65) Prior Publication Data
US 2010/0024429 A1    Feb. 4, 2010

(51) Int. Cl.
*F23K 5/20*    (2006.01)
(52) U.S. Cl.
USPC ............. 431/11; 431/5; 431/115; 431/173; 431/181; 431/207; 60/39.182; 60/736; 60/772; 60/806; 126/100; 126/301; 165/104.26; 165/272
(58) Field of Classification Search ............. 431/11, 431/207, 181, 5, 115, 247, 173, 215; 60/736, 60/772, 39.182, 806; 126/100, 301; 165/272, 165/104.26
See application file for complete search history.

(56) References Cited

U.S. PATENT DOCUMENTS

| | | | |
|---|---|---|---|
| 3,517,730 A | 6/1970 | Wyatt | |
| 3,722,797 A | 3/1973 | Hammill | |
| 3,852,805 A | 12/1974 | Brzozowski | |
| 4,033,406 A | 7/1977 | Basiulis | |
| 4,036,290 A | 7/1977 | Kelly | |
| 4,149,588 A | 4/1979 | Waters | |
| 4,226,282 A | 10/1980 | Kunsagi et al. | |
| 4,234,782 A | 11/1980 | Barabas et al. | |
| 4,372,110 A | 2/1983 | Cheng | |
| 4,567,857 A * | 2/1986 | Houseman et al. | 123/3 |
| 4,570,446 A * | 2/1986 | Matsubara et al. | 62/46.2 |
| 4,932,204 A | 6/1990 | Pavel et al. | |
| 5,248,252 A * | 9/1993 | Delichatsios et al. | 431/207 |
| 5,311,930 A | 5/1994 | Bruenn | |
| 5,632,143 A | 5/1997 | Fisher et al. | |

(Continued)

FOREIGN PATENT DOCUMENTS

| | | |
|---|---|---|
| DE | 294483 | 4/1915 |
| EP | 0 794 401 A2 | 9/1997 |
| GB | 2 099 126 A | 12/1982 |

OTHER PUBLICATIONS

Hua Zhang et al.; "Condenser for a Combined Cycle Power Plant"; filed Jul. 29, 2008 as U.S. Appl. No. 12/181,741.

(Continued)

*Primary Examiner* — Avinash Savani
(74) *Attorney, Agent, or Firm* — Cantor Colburn LLP

(57) ABSTRACT

An apparatus, a system and a method by which fuel gas to drive a heat source is heated are provided. The apparatus includes a first gas passage by which at least a portion of the fuel gas is transported from an inlet to an outlet, the outlet being fluidly coupled to the heat source, a plurality of heat pipes in thermal communication, at respective first ends thereof, with the portion of the fuel gas transported by the first gas passage, and a heating element, fluidly coupled to the heat source to receive exhaust of the heat source, through which respective second ends of the heat pipes extend to be in position to be heated by the exhaust.

20 Claims, 1 Drawing Sheet

U.S. PATENT DOCUMENTS

| | | |
|---|---|---|
| 5,845,481 A * | 12/1998 | Briesch et al. .......... 60/776 |
| 5,918,555 A | 7/1999 | Winegar |
| 6,041,588 A | 3/2000 | Bruckner et al. |
| 6,065,280 A | 5/2000 | Ranasinghe et al. |
| 6,132,823 A | 10/2000 | Qu |
| 6,241,009 B1 | 6/2001 | Rush |
| 6,397,575 B2 | 6/2002 | Tomlinson et al. |
| 6,782,703 B2 | 8/2004 | Dovali-Solis |
| 6,866,092 B1 | 3/2005 | Molivadas |
| 6,874,322 B2 | 4/2005 | Schwarzott |
| 6,962,051 B2 | 11/2005 | Radcliff |
| 7,069,716 B1 | 7/2006 | Childers |
| 7,131,294 B2 | 11/2006 | Manole |
| 7,382,047 B2 | 6/2008 | Chen et al. |
| 7,621,720 B2 | 11/2009 | Nies |
| 7,730,727 B2 | 6/2010 | Yuan et al. |
| 2003/0182944 A1 | 10/2003 | Hoffman et al. |
| 2004/0045294 A1 | 3/2004 | Kobayashi et al. |
| 2006/0083626 A1 | 4/2006 | Manole |
| 2007/0017207 A1 | 1/2007 | Smith et al. |
| 2007/0068167 A1 | 3/2007 | Patel et al. |
| 2007/0074515 A1 | 4/2007 | Yoshino |
| 2007/0234704 A1 | 10/2007 | Moniz et al. |
| 2008/0115923 A1 | 5/2008 | Yamanaka et al. |
| 2008/0290567 A1 | 11/2008 | Thillen et al. |
| 2008/0304954 A1 | 12/2008 | Hoffman et al. |
| 2010/0024382 A1 | 2/2010 | Zhang et al. |
| 2010/0089062 A1 | 4/2010 | Cao |

OTHER PUBLICATIONS

Hua Zhang et al.; "Combined Cycle Power Plant"; filed Oct. 17, 2008 as U.S. Appl. No. 12/253,435.

Hua Zhang; "Heat Pipe for Removing Thermal Energy from Exhaust Gas"; filed Jul. 18, 2008 as U.S. Appl. No. 12/175,966.

EP Search Report for EP Application No. EP09173330. Dated Nov. 25, 2010.

EP Search Report for Application No. EP 09 16 5813; Search Report dated Nov. 18, 2009.

\* cited by examiner

APPARATUS, SYSTEM AND METHOD FOR HEATING FUEL GAS USING GAS TURBINE EXHAUST

BACKGROUND

Aspects of the present invention are directed to an apparatus, system and method for heating fuel gas using exhaust from a heat source.

Typically, a fuel gas heater uses intermediate pressure (IP) water for fuel gas heating in combined cycle units and an electric heater for fuel gas heating in simple cycle units. IP water heating typically requires an extensive and complicated set of supported apparatuses. Conversely, the typical electric heater is large and power intensive since the electric heater is applied for fuel gas heating at least until a heat recovery steam generator (HRSG) can come on-line, which may take an extended period of time.

SUMMARY

In accordance with an aspect of the invention, an apparatus by which fuel gas to drive a heat source is heated is provided and includes a first gas passage by which at least a portion of the fuel gas is transported from an inlet to an outlet, the outlet being fluidly coupled to the heat source, a plurality of heat pipes in thermal communication, at respective first ends thereof, with the portion of the fuel gas transported by the first gas passage, and a heating element, fluidly coupled to the heat source to receive exhaust of the heat source, through which respective second ends of the heat pipes extend to be in position to be heated by the exhaust.

In accordance with another aspect of the invention, a system for use in a combined cycle, simple cycle or rankine cycle power plant is provided and includes a heat source configured to generate heat from a combustion of fuel gas therein, a first gas passage by which at least a portion of the fuel gas for use in the heat source is transported from an inlet to an outlet, the outlet being fluidly coupled to the heat source, a plurality of heat pipes in thermal communication, at respective first ends thereof, with the portion of the fuel gas transported by the first gas passage, and a heating element, fluidly coupled to the heat source to receive exhaust of the heat source, through which respective second ends of the heat pipes extend to be in position to be heated by the exhaust.

In accordance with another aspect of the invention, a method of operating a combined cycle, simple cycle or rankine cycle power plant is provided and includes transporting fuel gas to a heat source along a gas passage, injecting the fuel gas from the gas passage into the heat source, combusting the fuel gas in the heat source, and transmitting heat generated by the combusting of the fuel gas in the heat source from the heat source to the gas passage to thereby heat the fuel gas transported therein prior to the injecting of the fuel gas into the heat source.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

The apparatus 1, which is described below, eliminates the need to use intermediate pressure (IP) water for fuel gas heating in combined cycle applications. The apparatus 1, however, may be applied for use in both combined cycle and simple cycle units. Moreover, the apparatus 1 may require a relatively small start-up electric heater.

Figure 1:
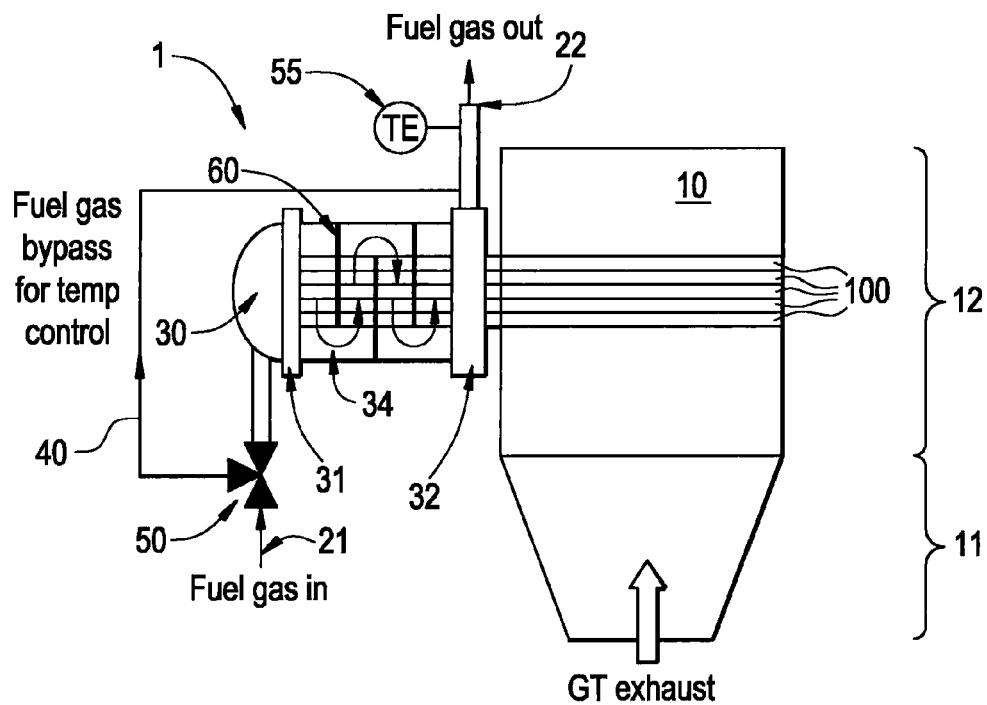
FIG. 1 is a schematic diagram of an exemplary apparatus to heat fuel gas.
Figure 2:
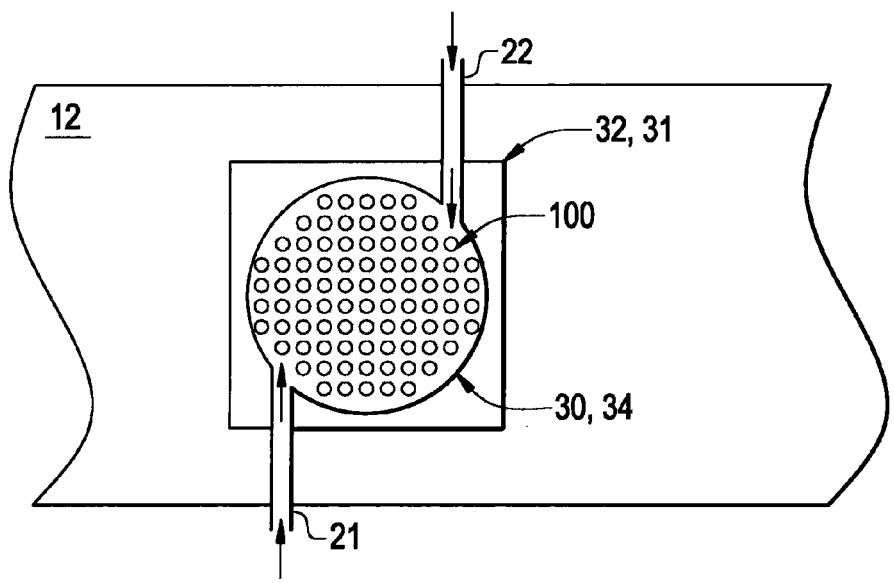
FIG. 2 is a cross-sectional view of the apparatus of FIG. 1.

With reference to FIGS. 1 and 2, an apparatus 1 is provided and configured to heat fuel gas for use in a heat source, such as a gas turbine or a steam generator. The apparatus 1 includes a first fuel gas passage 34, and a second fuel gas passage 40. The first and second fuel gas passages 34 and 40 are arranged in parallel with one another and may include piping that is configured to transport the fuel gas for use in driving the heat source from an inlet 21 to an outlet 22. The inlet 21 and the outlet 22 are each common to the first and second fuel gas passages 34 and 40.

A plurality of heat pipes 100 having first and second opposing ends are disposed in thermal communication at their respective first ends with the respective portion of the fuel gas transported by at least one of the first and second fuel gas passages 34 and 40. The second ends of the heat pipes 100 extend through a heating element, such as a main body 12 of the exhaust duct 10, where a heat recovery steam generator (HRSG) resides for combined cycle applications, to be positioned to be heated by exhaust emitted by the heat source.

A valve 50 may be provided to increase or decrease an amount of the fuel gas transported by each of the first and second fuel gas passages 34 and 40. The valve 50 may be manually or automatically controlled. Where the valve 50 is automatically controlled, the valve 50 may be coupled to a processing unit which controls the valve to increase or decrease an amount of the fuel gas in the first and second fuel gas passages 34 and 40. In either case, it is understood that the control of the valve 50 would be based on various parameters, such as ambient atmospheric temperatures, a performance of the heat source and/or temperature measurements provided by a temperature measuring device (TE) 55, such as a thermocouple, of the fuel gas at any one or more measurement points. Such measurement points could be positioned at, e.g., the inlet 21, the outlet 22, positions within the exhaust duct 10 or positions within the heat source.

In an embodiment, the valve 50, which may be configured as a part of a three-way valve, is disposed along the one of the fuel passages, e.g., fuel gas passage 40 of FIG. 1, which is not in direct thermal communication with the plurality of the heat pipes 100. In this way, the fuel gas passage 40 serves as a fuel gas bypass and the valve 50 can be controlled to allow more fuel to bypass the heating action of the heat pipes 100 when the fuel temperature exceeds preselected limits and to prevent fuel from bypassing the heating action of the heat pipes 100 when the fuel temperature decreases.

In another embodiment, the one of the gas passages, e.g., the fuel gas passage 34 of FIG. 1, which is in thermal communication with the plurality of the heat pipes 100 may include a fuel gas header 30 and baffles 60. The fuel gas header 30 is fluidly coupled on one side thereof to the common inlet 21 and, on another side thereof, to the fuel gas passage 34. Here, a first flange 31 may be provided as a coupling between the gas header 30 and the fuel gas passage 34. Similarly, a second flange 32 may be provided to support the fluid coupling of the fuel gas passage 34 to the outlet 22 and such that the first and second flanges 31 and 32 bookend the respective first ends of the heat pipes 100.

With reference to FIG. 2, it is noted that the plurality of the heat pipes 100 may be arranged with respect to one another in various formations and configurations that promote thermal communication between exterior surfaces of the heat pipes 100 and the fuel gas. These formations may include circular formations, as shown, or, alternately, rectangular formations. Within the formations themselves, the heat pipes 100 may be configured to be in-line with each other, as shown, or, alternately, staggered with respect to one another.

In an embodiment, the heat pipes 100 may include liquid heat pipes which are sealed with fluids, such as water, inside. In this case, when the second ends of the heat pipes 100 are heated, by, e.g., exhaust gases within the exhaust duct 10, the fluids within the heat pipes 100 evaporate. The generated vapor then flows to first ends of the heat pipes 100 where the vapor condenses on interior surfaces of the heat pipes 100. This process releases heat which is transferred to the fuel gas in, e.g., the fuel gas passage 34.

In another embodiment, the heat pipes 100 may include solid-state heat pipes (SSHP). Here, the heat pipes 100 each include a vacuum tube that is coated with Qu-material on an interior surface and sealed. The Qu-material then serves to conduct heat from the exhaust gases and to the fuel gas.

As noted above, the heating element may include an exhaust duct 10, which is coupled to the heat source. The exhaust duct 10 may include an inlet 11, which is fluidly coupled to the heat source, and a main body 12, which is coupled to the inlet 11 and through which the plurality of the heat pipes 100 extend. Here, the exhaust gases from the heat source enter the exhaust duct 10 via the inlet 11 and flow through the main body 12 where they flow over and around the heat pipes 100.

In accordance with another aspect, a system for use in a combined cycle, simple cycle or rankine cycle power plant is provided and includes a heat source, such as a gas turbine, which is configured to generate heat in the form of heated exhaust gases from combustion of fuel gas. A first gas passage 34 is provided by which at least a portion of the fuel gas for use in the heat source is transported from an inlet 21 to an outlet 22, where the outlet 22 is fluidly coupled to the heat source. A plurality of heat pipes 100 is disposed in thermal communication, at respective first ends thereof, with the portion of the fuel gas transported by the first gas passage 34. A heating element, such as an exhaust duct 10, is fluidly coupled to the heat source to receive exhaust of the heat source, and provided such that respective second ends of the heat pipes 100 extend through the heating element to be in position to be heated by the exhaust.

In accordance with another aspect of the invention, a method of operating a combined cycle, simple cycle or rankine cycle power plant is provided and includes transporting fuel gas to a heat source, such as a gas turbine, along a gas passage 34, injecting the fuel gas from the gas passage 34 into the heat source, combusting the fuel gas in the heat source, transmitting heat generated by the combusting of the fuel gas in the heat source from the heat source to the gas passage 34 to thereby heat the fuel gas transported therein prior to the injecting of the fuel gas into the heat source.

In accordance with further embodiments, the method may additionally include controlling an amount of the fuel gas in each of the first and a second fuel gas passages 34 and 40. Also, the transmitting of the heat may include at least one of transmitting the heat via liquid heat pipes 100 and transmitting the heat via solid state heat pipes 100.

Here, it is understood that the various embodiments described above can be installed jointly or separately. That is, the heat pipes 100 may include only liquid or solid state heat pipes 100 or a combination of the two types. Also, the heat pipes 100 may be configured to be in thermal communication with only one of the fuel gas passages 34 and 40 or, in another configuration, both of the fuel gas passages 34 and 40. Similarly, the valve 50 can be plural in number and disposed along both fuel gas passages 34 and 40.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. An apparatus by which fuel gas to drive a heat source is heated, comprising:
    a first gas passage including piping by which at least a portion of the fuel gas is transported from an inlet to an outlet, the outlet being fluidly coupled to the heat source;
    a plurality of heat pipes in thermal communication, at respective first ends thereof, with the portion of the fuel gas transported by the first gas passage; and
    a heating element remote from the piping and of the first gas passage fluidly coupled to the heat source to receive exhaust of the heat source, the heating element including a main body through which respective second ends of the heat pipes extend and through which the exhaust flows such that the exhaust flows over and around the heat pipes whereby the heat pipes are heated by the heat of the exhaust,
    the heat pipes being configured to transmit the heat of the exhaust from an interior of the main body to an exterior of the main body and subsequently to the portion of the fuel in the piping of the first gas passage.

2. The apparatus according to claim 1, wherein the heat source comprises a gas turbine.

3. The apparatus according to claim 1, further comprising:
    a second gas passage by which a remaining portion of the fuel gas is transported from the inlet to the outlet; and
    a valve to increase or decrease an amount of the fuel gas transported by each of the first and second gas passages.

4. The apparatus according to claim 3, wherein the valve is automatically controlled based on a temperature of the fuel gas.

5. The apparatus according to claim 1, wherein the first gas passage comprises a fuel gas header fluidly coupled to the inlet.

6. The apparatus according to claim 1, wherein the first gas passage comprises first and second flanges that bookend the respective first ends of the heat pipes.

7. The apparatus according to claim 1, wherein the plurality of the heat pipes are arranged in a circular formation.

8. The apparatus according to claim 1, wherein the plurality of the heat pipes comprise liquid heat pipes.

9. The apparatus according to claim 1, wherein the plurality of the heat pipes comprise solid state heat pipes.

10. The apparatus according to claim 1, wherein the heating element comprises an exhaust duct, which is coupled to the heat source and which comprises:
    an exhaust duct inlet fluidly coupled to the heat source; and
    a exhaust duct main body coupled to the exhaust duct inlet and through which the plurality of the heat pipes extend.

11. A system for use in a combined cycle, simple cycle or rankine cycle power plant, comprising:
- a heat source configured to generate heat from a combustion of fuel gas therein;
- a first gas passage including piping by which at least a portion of the fuel gas for use in the heat source is transported from an inlet to an outlet, the outlet being fluidly coupled to the heat source;
- a plurality of heat pipes in thermal communication, at respective first ends thereof, with the portion of the fuel gas transported by the first gas passage; and
- a heating element remote from the piping of the first gas passage and fluidly coupled to the heat source to receive exhaust of the heat source, the heating element including a main body through which respective second ends of the heat pipes extend and through which the exhaust flows such that the exhaust flows over and around the heat pipes whereby the heat pipes are heated by heat of the exhaust,
- the heat pipes being configured to transmit the heat of the exhaust from an interior of the main body to an exterior of the main body and subsequently to the portion of the fuel in the piping of the first gas passage.

12. The system according to claim 11, wherein the heat source comprises a gas turbine.

13. The system according to claim 11, wherein the plurality of the heat pipes comprise liquid heat pipes.

14. The system according to claim 11, wherein the plurality of the heat pipes comprise solid state heat pipes.

15. The system according to claim 11, wherein the heating element comprises an exhaust duct, which is coupled to the heat source and which comprises:
- an exhaust duct inlet fluidly coupled to the heat source; and
- a exhaust duct main body coupled to the exhaust duct inlet and through which the plurality of the heat pipes extend.

16. A method of operating a combined cycle, simple cycle or rankine cycle power plant, the method comprising:
- transporting fuel gas to a heat source along a piping of a gas passage;
- injecting the fuel gas from the gas passage into the heat source;
- combusting the fuel gas in the heat source; and
- transmitting heat generated by the combusting of the fuel gas in the heat source from an interior of a main body of the heat source, which is remote from the piping of the gas passage, to an exterior of the main body and subsequently to the piping of the gas passage to thereby heat the fuel gas transported therein prior to the injecting of the fuel gas into the heat source.

17. The method according to claim 16, further comprising controlling an amount of the fuel gas in the gas passage.

18. The method according to claim 16, wherein the transmitting of the heat comprises at least one of transmitting the heat via liquid heat pipes and transmitting the heat via solid state heat pipes.

19. The apparatus according to claim 1, wherein the heat pipes are transversely oriented with respect to a direction of the flow of the exhaust and a transportation direction of the portion of the fuel in the piping.

20. The apparatus according to claim 19, wherein the direction of the flow of the exhaust and the transportation direction of the portion of the fuel in the piping are substantially parallel.

* * * * *